Aug. 13, 1946.   K. A. LANG   2,405,837
CURRENT CONTROL APPARATUS
Filed Jan. 22, 1945

Inventor:
KARL A. LANG

Patented Aug. 13, 1946

2,405,837

UNITED STATES PATENT OFFICE 2,405,837

CURRENT CONTROL APPARATUS

Karl A. Lang, Glenview, Ill., assignor to Lindberg Engineering Company, Chicago, Ill., a corporation of Illinois Application January 22, 1945, Serial No. 573,977

8 Claims. (Cl. 171—119)

1

This invention relates to current control apparatus and more particularly to apparatus for supplying a substantially constant current to a load from a constant potential source.

Resonant type constant current devices as heretofore known have two inherent defects. In the first place the current output tends to increase in proportion to increases in supply voltage and in the second place the output voltage tends to increase to a dangerously high value on open circuit or extremely high resistance in the load circuit.

This present invention has for one of its objects the provision of a current control apparatus in which fluctuations in output current in response to minor changes in input voltage are reduced and in which voltages under open circuit conditions are held to safe values.

Another object of the invention is to provide a resonant type current control apparatus in which the effective values of the capacitor elements are balanced.

Still another object is to provide current control apparatus in which the voltage across the capacitors is limited to a safe value.

A further object is to provide current control apparatus which is automatically disconnected under excessive load or open load circuit conditions. According to one feature a control switch is operated in accordance with the current flow through inductively coupled windings across the capacitor elements of the circuit.

The above and other objects and advantages of the invention will be more readily apparent from the following description when read in connection with the accompanying drawing, in which—

Figure 1:
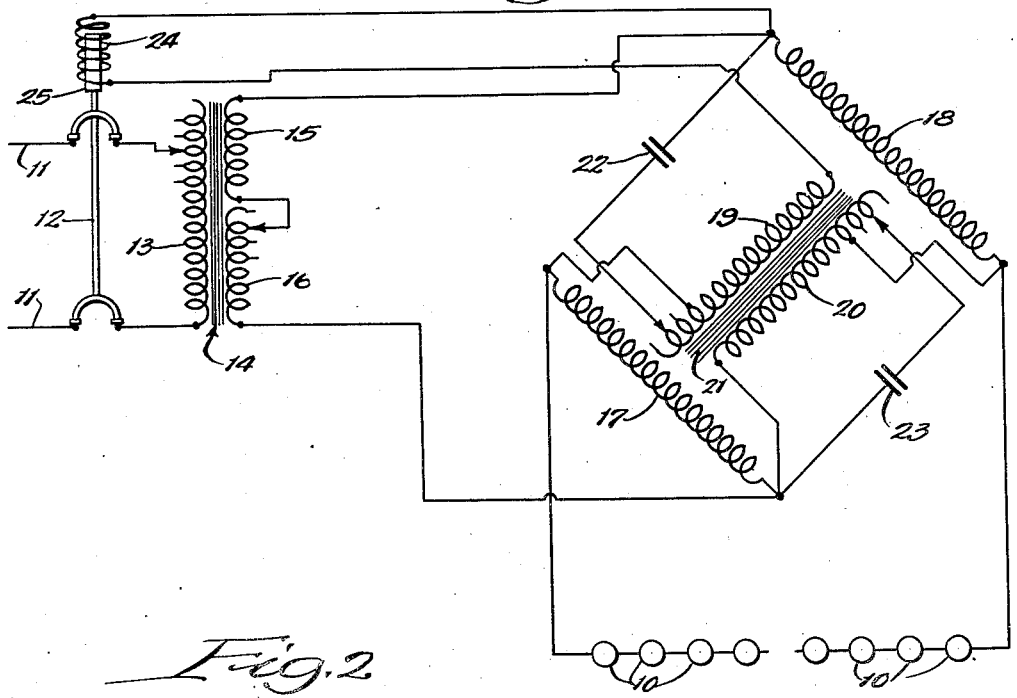
Figure 2:
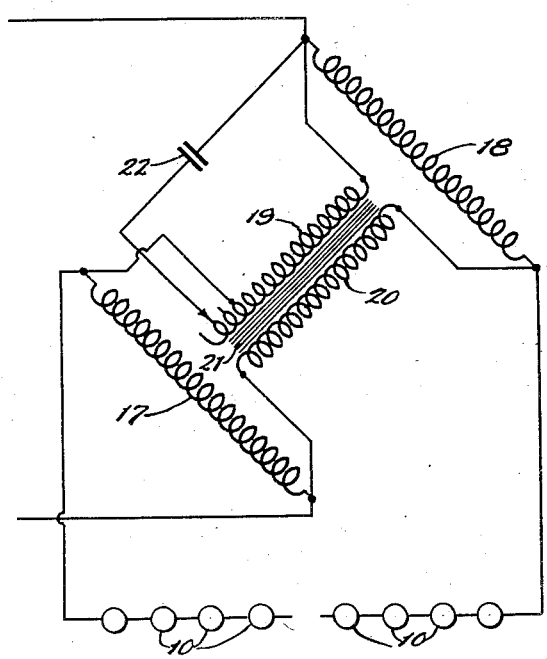

Figure 1 is a circuit diagram of one form of apparatus embodying the invention and Figure 2 is a partial diagram of an alternative circuit.

In the circuit shown in Figure 1, a load indicated as a series of electric lamps is adapted to be connected to an alternating current supply source 11 which may be the usual commercial supply. The supply source 11 is connected through a switch 12 to the primary winding 13 of a transformer 14. Preferably one side of the supply source is connected to one end of the primary winding 13 and the other side is adapted to be connected to one of a series of taps on the winding to adjust the transformer for different supply voltages. The transformer is provided with a split secondary winding having two sections 15 and 16. One of the sections is formed with a series of taps and the other section is adapted to be connected to any one of the taps to vary the voltage supplied to the regulating apparatus for dimming control on the light.

The regulating apparatus comprises a resonate type circuit including a pair of reactors 17 and 18. The reactor 17 is connected at one end to the outside of the secondary winding 16 and the reactor 18 is similarly connected at one end to the outside of the transformer secondary 15. The opposite sides of the reactors are connected to the load circuit as shown.

A pair of inductive coupled windings 19 and 20 are connected to the reactors in a bridge circuit. Preferably the windings are connected at points spaced from one end thereof to the reactors for a purpose to appear later. The windings 19 and 20 are wound on a common iron core indicated at 21 which is preferably so constructed as to minimize air gaps. This is preferred to minimize the exciting current through the windings and the reactive components of the windings.

The circuit is completed by a pair of capacitors 22 and 23 connected across the windings 19 and 20. As shown, the winding 19 is connected through a coil 24 to one end of the capacitor 22 and the opposite side of the capacitor is connected to any one of a plurality of taps on the winding 19, as shown. Similarly the winding 20 is connected directly to one side of the capacitor 23 and the opposite side of the capacitor may be connected to any one of a plurality of taps on the winding.

The coil 24 is arranged to control operation of the switch 12 and, for the purpose of illustration, is shown as being wound around a movable core 25 which is connected to the switch. The coil 24 and the switch parts are so constructed that the switch is normally closed but will open when the current through the coil exceeds a pre-determined value.

With the construction as shown and so far described, the windings 19 and 20 function to balance the capacitors 22 and 23 so that their effective values in the circuit will be substantially equal at all times. In the commercial production of capacitors, it is difficult, if not impossible, to maintain the values exactly the same and the windings tend to equalize any differences between the capacitors so that they will be more nearly balanced in the circuit. By changing the taps on the windings 19 and 20, the effective capacity in the circuit may be varied to vary the current output of the circuit and to vary the leading current introduced into the supply circuit.

By this means the power factor in the circuit may be adjusted to be maintained more nearly at unity.

The windings 19 and 20 have for one of their most important purposes the limiting of the open circuit voltage in the load circuit. As is well known with resonant type constant potential to constant current type circuits, in the event the load circuit is interrupted, the voltage across the output terminals of the regulating circuit tends to increase to an extremely high value. In the circuit shown, as the voltage tends to increase the core 21 saturates to limit the voltage drop across the windings 19 and 20. If the core is operated at a relatively high flux density so that it will saturate on a relatively small voltage increase, the load voltage on open circuit will be limited to a relatively small amount over normal. When the core flux density is relatively low it requires a greater voltage increase to saturate and the load voltage can increase to a greater extent. This operation protects the capacitors by limiting the voltage which can be impressed across them and at the same time limits the voltage across the output terminals of the regulating circuit. By properly designing the windings and the size of the core 21, the voltage values across the capacitors and in the output circuit can be limited to substantially any desired extent.

The windings 19 and 20 also tend to reduce fluctuations in load current upon relatively small changes in supply voltage. In a normal resonant type regulating circuit, the output current tends to increase substantially in proportion to increases in supply voltage. When the windings 19 and 20 are used, they tend to draw slightly more current upon an increase in supply voltage at least partly to compensate for the tendency of the circuit to increase its output current so that the current in the load circuit is maintained more nearly constant. It will be apparent that the compensating effect of the windings is insufficient to compensate for substantial changes in supply voltage such as those produced by changing the taps on either the primary or secondary of the supply transformer.

In one circuit constructed according to the invention, I have found that with a supply voltage of about 910 volts the amperage flow through the reactors 17 and 18 and through the capacitors 22 and 23 is about 4.6 amperes. The load circuit voltage varies between zero at no load and 910 volts at normal load and will increase above 910 volts under open circuit conditions an amount depending upon the design and tap adjustment of the windings. Under normal load conditions, the current flow thru the windings 19 and 20 is about .2 ampere and increases to about 8 amperes when the load circuit is opened. This increase in current through the windings occurs rather sharply as the core 21 saturates providing a highly desirable control characteristic for the supply switch 12 so that it will be opened positively at a pre-determined voltage value in the load circuit.

Figure 2 illustrates an alternative regulating circuit in which only a single capacitor is employed. Parts of this circuit corresponding to like parts of the circuit of Figure 1 have been indicated by the same reference numerals. This construction is substantially similar to that of Figure 1 except that one of the capacitors is omitted and the tap changes on the winding 20 are also omitted. As shown in Figure 2, the winding 20 is connected directly from one end of the reactor 17 to one end of the reactor 18. Since the winding 20 is coupled through the winding 19 to the capacitor 22, it provides an effective capacitance in the circuit so that the circuit functions in substantially the same manner as that of Figure 1. The principal difference is that in the circuit of Figure 2, the windings 19 and 20 must carry a higher current since the current through the winding 20 must take the place of that normally flowing through the capacitor 23 in Figure 1. It will be understood that a control coil such as the coil 24 of Figure 1 could be connected in series with either of the windings 19 or 20 to control the supply switch since the current through these windings will increase substantially under open load circuit conditions.

While two embodiments of the invention have been shown and described in detail, it will be understood that these embodiments are illustrative only and are not intended as a definition of the scope of the invention, reference being had for this purpose to the appended claims.

What is claimed is:

1. Current control apparatus comprising a pair of reactors having one end of each connected to a supply source and the other end of each connected to a load, a pair of inductively coupled windings connected in a bridge circuit to the reactors, and a capacitor connected across at least one of the windings.

2. Current control apparatus comprising a pair of reactors having one end of each connected to a supply source and the other end of each connected to a load, a pair of inductively coupled windings connected in a bridge circuit to the reactors, and a pair of capacitors connected respectively across the windings.

3. Current control apparatus comprising a pair of reactors having one end of each connected to a supply source and the other end of each connected to a load, a pair of inductively coupled windings connected in a bridge circuit to the reactors, a capacitor connected at one side to one end of one of the windings, and means to connect the other side of the capacitor to one of a plurality of points in the length of said one of the windings.

4. Current control apparatus comprising a pair of reactors having one end of each connected to a supply source and the other end of each connected to a load, a pair of inductively coupled windings connected in a bridge circuit to the reactors, each of the windings having a plurality of taps thereon, and a pair of capacitors each connected at one side to one end of one of the windings and at its other side to a selected one of the taps on said one of the windings.

5. Current control apparatus for connecting an alternating current supply circuit to a load comprising a pair of reactors having one end of each connected to the supply circuit and the other end to the load, a pair of inductively coupled windings connected in a bridge circuit to the reactors, a capacitor connected across at least one of the windings, switch means to control connection of the reactors to the supply circuit, and means responsive to the current flow through the windings to control the switch means.

6. Current control apparatus for connecting an alternating current supply circuit to a load comprising a pair of reactors having one end of each connected to the supply circuit and the other end to the load, a pair of inductively coupled windings connected in a bridge circuit to the reactors, a capacitor connected across at least one of the windings, switch means to control connection of the reactors to the supply circuit, and an operating coil for the switch means connected in series with one of the windings.

7. Current control apparatus for connecting an alternating current supply source to a load comprising a pair of reactors connected at one end to the supply source and at the other end to the load, a pair of inductively coupled windings connected in a bridge circuit to the reactors, a magnetic core for the windings which normally operates at a high flux density, and a capacitor connected across at least one of the windings.

8. Current control apparatus for connecting an alternating current supply source to a load comprising a pair of reactors connected at one end to the supply source and at the other end to the load, a pair of inductively coupled windings connected in a bridge circuit to the reactors, a magnetic core for the windings which normally operates at a high flux density, a capacitor connected across at least one of the windings, switch means for connecting the reactors to the supply circuit, and means responsive to the current flow through the windings to control the switch means.

KARL A. LANG.